(12) United States Patent
Kanayama

(10) Patent No.: US 10,005,255 B2
(45) Date of Patent: Jun. 26, 2018

(54) LONG FIBER NONWOVEN FABRIC AND LAMINATE OF FABRICS HAVING LONG FIBER NONWOVEN FABRIC

(71) Applicant: finetrack, Kobe-shi (JP)

(72) Inventor: Yotaro Kanayama, Kobe (JP)

(73) Assignee: Finetrack, Kobe-shi, Hyogo (JP)

( * ) Notice: Subject to any disclaimer, the term of this patent is extended or adjusted under 35 U.S.C. 154(b) by 214 days.

(21) Appl. No.: 14/166,695

(22) Filed: Jan. 28, 2014

(65) Prior Publication Data

US 2014/0248468 A1    Sep. 4, 2014

(30) Foreign Application Priority Data

Mar. 4, 2013   (JP) ................... 2013-042030
Dec. 2, 2013   (JP) ................... 2013-248980

(51) Int. Cl.
*B32B 3/30*   (2006.01)
*B32B 5/02*   (2006.01)
(Continued)

(52) U.S. Cl.
CPC ............ *B32B 5/022* (2013.01); *B32B 5/26* (2013.01); *D04H 1/50* (2013.01); *D04H 3/00* (2013.01);
(Continued)

(58) Field of Classification Search
CPC ....... B32B 5/022; B32B 5/26; B32B 2250/20; B32B 2262/0246; B32B 2262/0253;
(Continued)

(56) References Cited

U.S. PATENT DOCUMENTS 3,695,985 A * 10/1972 Brock .................... D04H 5/04
                                                           428/152
3,784,441 A *  1/1974 Kaempen ............... B32B 5/26
                                                           428/112
(Continued)

FOREIGN PATENT DOCUMENTS

EP    0042150 A1   12/1981
EP    0757127 A1    2/1997
(Continued)

OTHER PUBLICATIONS

JP 2006150222 A; Machine Translation (provided by Applicant).*
(Continued)

*Primary Examiner* — Maria V Ewald
*Assistant Examiner* — Travis M Figg
(74) *Attorney, Agent, or Firm* — Knobbe, Martens, Olson & Bear, LLP

(57) ABSTRACT

The invention aims at providing a light long fiber nonwoven fabric having a sufficient strength, on which irregularly uneven wrinkles (or crimps) having a large difference in height (bulkiness). It also aims at providing a laminate of fabrics including the long fiber nonwoven fabric. The long fiber nonwoven fabric is a long fiber nonwoven fabric formed from a long fiber, on which irregularly uneven wrinkles having a large difference in height are formed. The laminate of fabrics includes the long fiber nonwoven fabric (the inner layer) and a first fabric (a first outer layer) laminated on one side of the long fiber nonwoven fabric, wherein a first space is formed between the long fiber nonwoven fabric (the inner layer) and the first fabric (first outer layer).

16 Claims, 3 Drawing Sheets

(51) Int. Cl.
| | |
|---|---|
| *B32B 5/26* | (2006.01) |
| *D04H 1/50* | (2012.01) |
| *D04H 3/00* | (2012.01) |
| *D04H 3/011* | (2012.01) |
| *D04H 3/04* | (2012.01) |
| *D04H 13/00* | (2006.01) |

(52) U.S. Cl.
CPC .............. *D04H 3/011* (2013.01); *D04H 3/04* (2013.01); *D04H 13/00* (2013.01); *B32B 2250/20* (2013.01); *B32B 2262/0246* (2013.01); *B32B 2262/0253* (2013.01); *B32B 2262/0261* (2013.01); *B32B 2262/0269* (2013.01); *B32B 2262/0276* (2013.01); *B32B 2262/0292* (2013.01); *B32B 2262/04* (2013.01); *B32B 2307/304* (2013.01); *B32B 2307/718* (2013.01); *B32B 2437/00* (2013.01); *Y10T 428/24446* (2015.01)

(58) Field of Classification Search
CPC .... B32B 2262/0261; B32B 2262/0269; B32B 2262/0276; B32B 2262/0292; B32B 2262/04; B32B 2307/03; D04H 1/50; D04H 13/00; D04H 3/00; D04H 3/011; D04H 3/04
USPC .......................... 428/181–183; 442/366–369
See application file for complete search history.

(56) References Cited

U.S. PATENT DOCUMENTS

| | | | | |
|---|---|---|---|---|
| 3,846,205 A | * | 11/1974 | Yazawa | D04H 13/00 156/291 |
| 4,429,002 A | * | 1/1984 | Fukada | D04H 3/16 28/247 |
| 4,810,556 A | | 3/1989 | Kobayashi et al. | |
| 5,306,545 A | * | 4/1994 | Shirayanagi | D04H 1/4291 128/206.12 |
| 5,840,633 A | * | 11/1998 | Kurihara | D04H 3/02 139/420 A |
| 6,048,808 A | * | 4/2000 | Kurihara | D04H 3/02 156/229 |
| 6,132,661 A | * | 10/2000 | Kurihara | D04H 3/04 264/176.1 |
| 2002/0058128 A1 | * | 5/2002 | Toyoshima | A61F 13/51108 428/182 |
| 2004/0224136 A1 | * | 11/2004 | Collier, IV | B32B 5/02 428/196 |
| 2010/0269283 A1 | * | 10/2010 | Shim | A47L 13/16 15/209.1 |
| 2010/0305687 A1 | * | 12/2010 | Ajji | A61F 2/06 623/1.41 |

FOREIGN PATENT DOCUMENTS

| | | |
|---|---|---|
| JP | S57-005957 A | 1/1982 |
| JP | S57-5957 A | 1/1982 |
| JP | S63-085153 A | 4/1988 |
| JP | H05-29742 U | 4/1993 |
| JP | H07-054256 A | 2/1995 |
| JP | H08-003850 A | 1/1996 |
| JP | H10-158966 A | 6/1998 |
| JP | 2001-048238 A | 2/2001 |
| JP | 2002-058619 A | 2/2002 |
| JP | 2005-220446 A | 8/2005 |
| JP | 2006-150222 A | 6/2006 |
| JP | 2006150222 A * | 6/2006 |
| JP | 2006150222 A * | 6/2006 |
| JP | 2007-177375 A | 7/2007 |
| JP | 2007-236437 A | 9/2007 |
| WO | 03/056089 A1 | 7/2003 |
| WO | 2005/001188 A1 | 1/2005 |

OTHER PUBLICATIONS

JP-2006150222-A; machine translation.*
Search Report dated Jun. 6, 2014 in EP Application No. 14153256.4.
Office Action dated Apr. 14, 2015 in corresponding JP application No. 2013-248980.
Office Action dated Oct. 30, 2015 in corresponding CN application No. 201410069148.0.
Office Action dated Jul. 26, 2016 in corresponding EP Application No. 14153256.4.
Office Action dated Apr. 19, 2016 in corresponding CN Application No. 201410069148.0.
Office Action dated Feb. 2, 2016 in corresponding EP Application No. 14153256.4.
Office Action dated Dec. 23, 2016 in corresponding EP Application No. 14153256.4.
Office Action dated Jul. 5, 2017 in corresponding EP Application No. 14153256.4.
Office Action dated Apr. 27, 2017 in corresponding CN Application No. 201410069148.0.
Chinese Office Action for Patent Application No. 201610629721.8 with English Translation in 29 pages.

* cited by examiner

LONG FIBER NONWOVEN FABRIC AND LAMINATE OF FABRICS HAVING LONG FIBER NONWOVEN FABRIC

CROSS-REFERENCE TO RELATED APPLICATION

This application claims priority to Japanese Patent Application No. 2013-042030 filed on Mar. 4, 2013, and Japanese Patent Application No. 2013-248980 filed on Dec. 2, 2013, the disclosure of which including the specification, the drawings, and the claims is hereby incorporated by reference in its entirety.

BACKGROUND OF THE INVENTION

Field of the Invention

The present invention relates to a long fiber nonwoven fabric which is processed so as to be bulky, and a laminate of fabrics having the long fiber nonwoven fabric.

Description of the Related Art

There is a short fiber nonwoven fabric formed by heat-treating a nonwoven fabric formed of short fibers with hot water having a temperature of 100° C. to form uneven crimps (see Patent Document 1). There is also a nonwoven fabric on which regular unevenness is formed by a regularly uneven emboss stretching process (see Patent Document 2).

PRIOR ART DOCUMENT

Patent Documents

Patent Document 1: JP-A-2005-220446
Patent Document 2: JP-A-2001-48238

According to Patent Document 1, however, the short fiber is used as a material, and thus in order to obtain a strength necessary for practical use, it is necessary to use a short fiber nonwoven fabric having a fabric weight with a strength capable of withstanding the practical use. In addition, though the irregular crimp process can be easily performed, if the fabric is used for a long time and washed many times, the crimp shape cannot be kept and tends to be gradually collapsed. According to Patent Document 2, the process is performed by using a uneven emboss roll, and thus the document only describes the nonwoven fabric having the regular unevenness formed alternately in both directions.

SUMMARY OF THE INVENTION

The present invention has been made in view of the problems described above, and aims at providing a light long fiber nonwoven fabric having a satisfactory strength on which irregularly uneven wrinkles (or crimps) having a large difference in height (bulkiness). The invention also aims at providing a laminate of fabrics having one or more long fiber nonwoven fabrics, an article of clothing and an article of bedding having this laminate of fabrics, a curtain, an article of covering, and the like having this laminate of fabrics.

The present invention, solving the problems described above, is a long fiber nonwoven fabric comprising a long fiber on which an irregularly uneven wrinkle having a large difference in height is formed. When a flat long fiber nonwoven fabric is processed so that it becomes three-dimensionally bulky in its thickness direction while the thickness of the nonwoven fabric is substantially maintained, a long fiber nonwoven fabric on which irregularly uneven wrinkles having a large difference in height are formed can be obtained.

According to this structure, a long fiber nonwoven fabric on which irregularly uneven wrinkles (or crimps) having a large difference in height (bulkiness) are formed can be provided. This nonwoven fabric becomes bulky in its thickness direction, whereby the irregular wrinkles or overlapped parts (feeling of wrinkled state) can be formed. As this long fiber nonwoven fabric uses a long fiber as a starting material of the nonwoven fabric, the fabric has satisfactory strength and lightness after the wrinkles are formed, even if a nonwoven fabric having a small fabric weight, which is light, is used. On the other hand, a nonwoven fabric formed of short fibers has larger thickness and fabric weight than those of the nonwoven fabric formed of the long fiber, thus resulting in poor lightness. In addition, even if the number of the washing treatments is increased, the wrinkle shape can be maintained for a long time. Furthermore, when this long fiber nonwoven fabric is applied to an inner layer of an article of clothing or an article of bedding, a monolayered or multilayered structure having an air layer can be formed, which is lighter, has a more excellent dryness, and can preferably maintain a heat-retaining property even if it gets wet, compared to conventional inner cotton articles including a cotton like fiber, feathers or down feathers. It is not necessary to fold up it perfectly, but the article can be easily packed it up in a container case or bag, and the article is excellent in compactness when it is contained.

According to one embodiment of the present invention, the long fiber nonwoven fabric on which the wrinkles are formed has a fabric weight of 3 to 60 times a fabric weight of a long fiber nonwoven fabric on which the wrinkles have not been formed yet. The fabric weight is preferably from 5 times to 60 times, for the reason of bulkiness.

According to one embodiment of the present invention, the long fiber nonwoven fabric on which the wrinkles are formed has a fabric weight of 15 g/m$^2$ to 300 g/m$^2$. The long fiber nonwoven fabric on which the wrinkles have not been formed yet has a fabric weight of 5 g/m$^2$ to 60 g/m$^2$, preferably 5 g/m$^2$ to less than 20 g/m$^2$, more preferably 6 g/m$^2$ to 10 g/m$^2$. The shape is more weakly maintained after the process as the fabric weight is decreased, and the bulkiness becomes smaller as the fabric weight is increased, and thus it is preferable that the fabric weight is within the range described above.

According to one embodiment of the present invention, the long fiber nonwoven fabric on which the wrinkles are formed has a bulkiness (h: a height from a level surface to a topmost part when the fabric is put on the level surface) of 5 times or more, preferably 10 times or more, more preferably 50 times or more, further preferably 100 times or more a thickness (t) of the long fiber nonwoven fabric on which the wrinkles have not been formed yet (see FIG. 2).

According to one embodiment of the present invention, the long fiber nonwoven fabric on which the wrinkles have not been formed yet has a thickness of 0.01 mm to 1.0 mm. The thickness is preferably from 0.02 mm to 0.5 mm, more preferably from 0.02 mm to 0.3 mm, further preferably from 0.02 mm to 0.2 mm, for the reason of the bulkiness.

According to one embodiment of the present invention, the long fiber nonwoven fabric on which the wrinkles are not formed is packed into a bag, to which heat and humidity are applied, thereby forming the wrinkle on the long fiber nonwoven fabric. It is preferable to randomly pack (disorderly) long fiber nonwoven fabric on which the wrinkles are not formed into a bag in a wrinkled state so as to form irregular wrinkles. That is, When the fabric is packed into the bag in a state in which it is carefully folded up, it is difficult to form the irregular wrinkles.

According to one embodiment of the present invention, the long fiber nonwoven fabric on which the wrinkles are not formed is produced by a wet method (for example, a water punch method), a dry method (for example, a tow opening method, or a burst fiber method), a spunbond method (for example, a chemical bond method, a thermal bond method, or a needle punch method), a melt-blowing method, or a crosswise lamination bonding. The production methods by the spunbond method, the melt-blowing or the crosswise lamination bonding are preferable for the reason of the formation and the maintenance of the wrinkle shape. As shown in FIGS. 4 and 5, the crosswise laminated nonwoven fabric produced by the crosswise lamination bonding has a laminated structure in which arranged wrap yarns 41 and arranged weft yarns 41 are overlapped with each other. As shown in a cross-sectional view of FIG. 5, the fabric has no overlapped parts, the thickness thereof can be thin, and the surface thereof is flat. According to the crosswise laminated nonwoven fabric, therefore, the thickness thereof can be made thin, and it has a dimensional stability and a high tensile strength, compared to nonwoven fabrics produced by the spunbond method. For example, the fabric weight is from 5 g/m$^2$ to 60 g/m$^2$, and the thickness is from 50 μm to 130 μm. The tensile strength is from 25 to 300 [N/50 mm] in a longitudinal direction and from 10 to 90 [N/50 mm] in a transverse direction. One example of the production method of the crosswise lamination bonding includes a production method disclosed in JP-A-2003-213560.

According to one embodiment of the present invention, the long fiber has a fiber thickness (a diameter) of preferably 1 μm to 100 μm, more preferably 5 μm to 50 μm, further preferably 5 μm to 10 μm.

According to one embodiment of the present invention, the long fiber is one or more long fibers of polyester, nylon, polypropylene, vinylon, aramid, acrylic, rayon, polyethylene, polyurethane and silk. The polyester is preferable for the reason of the formation and maintenance of the wrinkled shape.

A laminate of fabrics of another invention includes the long fiber nonwoven fabric described above (an inner layer), and a first fabric (a first outer layer) which is laminated on one side of the long fiber nonwoven fabric, wherein a first space is formed between the long fiber nonwoven fabric (the inner layer) and the first fabric (the first outer layer). This laminate of fabrics has a two-layer structure. This first space improves a thermal insulation property and a heat-retaining property.

One embodiment of the present invention further includes a second fabric (a second outer layer) which is laminated on the other side of the long fiber nonwoven fabric (inner layer), wherein a second space is formed between the long fiber nonwoven fabric (the inner layer) and the second fabric (second outer layer). This laminate of fabrics has a three-layer structure. This second space further improve the thermal insulation property and the heat-retaining property.

According to one embodiment of the present invention, two or more of the long fiber nonwoven fabric described above (the inner layers) are laminated, wherein a third space is formed between the long fiber nonwoven fabrics. The inner layer is formed from two of the long fiber nonwoven fabrics, and thus a space is formed between the inner layers, thereby resulting in the more improved heat-retaining effect.

An article of clothing or an article of bedding of the other invention is formed from the laminate of fabrics described above. The article of clothing is not particularly limited, and includes, for example, vest types, short sleeves types, long sleeves types, short pants types, long pants types, coverall types, hats, gloves, socks, balaclavas, shawls, waistcloths, mufflers, and the like. The article of bedding is not also particularly limited, and includes, for example, sleeping bags, comforters, mattresses, pillows, cushions, blankets, and the like. A curtain or an article of covering of the other invention is formed from the laminate of fabrics described above. The article of covering is not particularly limited, and includes, for example, a carpet, a floor covering, and the like.

In the inventions described above, the long fiber or the long fiber nonwoven fabric before the process described above may be suitably subjected to various processing treatments (for example, a moisture-permeable and water-proofing processing, water-repellent processing, repulsive processing, antimicrobial and deodorant processing, water absorption processing, flame-proof processing, and the like).

In the inventions described above, materials of yarns and sewing methods of the first and second fabrics (when the long fiber nonwoven fabric on which wrinkles are formed is used as the inner layer, the first and second fabrics form the outer layers) are not particularly limited. In addition, they may be suitably subjected to various processing treatments (for example, a moisture-permeable and water-proofing processing, water-repellent processing, repulsive processing, antimicrobial and deodorant processing, water absorption processing, flame-proof processing, and the like). The first and second fabrics (the first and second outer layers) may be the same fabrics or different fabrics. The first and second fabrics have, for example, a knitted structure or a woven structure, or are a nonwoven fabric or a film. The first and second fabrics may have a monolayered structure or a multilayer structure, and the monolayered structure is more preferable in terms of the lightness. The first and second fabrics may be, for example, synthetic fibers such as polyester and nylon, or natural fibers. The first and second fabrics may be formed of one kind of fiber or a combination of multiple kinds of fibers. The various processing treatments described above may be applied to original yarns of the first and second fabrics (the fibers) themselves.

The fabric of the inner layer (the long fiber nonwoven fabric on which the wrinkles are formed) is arranged between the first outer layer and the second outer layer (the first fabric and the second fabric), but it is not necessarily arranged between the first fabric and the second fabric. Depending on the article of clothing (the shape of the article of clothing, the shape of the parts of the article of clothing, the necessity of the parts, and the objective) or the article of bedding (the shape of the article of bedding, the shape of the parts of the article of bedding, the necessity of the parts, and the objective), there may be a case in which the inner layer is omitted and there are the first outer layer and the second outer layer alone, or there may be a case in which another fabric (or member) exists between the first outer layer and the second outer layer. For example, a rubber material for fit or fastening, or a freely openable or closable fastener may be provided. The fastener may include, for example, buttons usually used, point fasteners (for example, snap buttons), line fasteners (for example, zippers and zip fasteners), or hook and loop fasteners (for example, Magic Tapes (registered trademark)). They may be used alone or in appropriate combination with two or more kinds thereof. The article of clothing may have a pocket.

In the inventions described above, when the inner layer is used in a laminated state of two or more layers of the long fiber nonwoven fabrics on which the wrinkles are formed, long fiber nonwoven fabrics having a bulkiness different from each other, such as a combination of a fabric having a small bulkiness and a fabric having a large bulkiness, may be laminated in a state in which a space is formed between the fabrics.

In the inventions described above, a long fiber nonwoven fabric having a different three-dimensional shape (or a fabric on which different bulkiness wrinkles are formed) may be used depending on the part of the article of clothing. The shape of the wrinkle may include, for example, a wave shape, an uneven shape, a crimp shape, and the like.

According to one embodiment of the present invention, fabrics to be laminated (the long fiber nonwoven fabrics on which the wrinkles are formed, the first and second fabrics) may not be stitched to hold except for end parts, or may be partly stitched to hold. A flat fabric may wholly or partly lie between the fabrics, and the flat fabric may be stitched partly to the fabric described above.

In the inventions described above, it is preferable that end parts of the fabrics of the inner layer (long fiber nonwoven fabrics on which the wrinkles are formed) are stitched to the first outer layer and/or the second outer layer at the end parts of the article of clothing. The compactness can be improved when the article is folded up, while the space is formed in a wide area to secure the heat-retaining property. Quilting or partial stop sewing (sewing of the inner layer fabric to the outer layer fabric) is not almost required, and thus a feeling of stiffness is reduced when the article of clothing is worn, and the feeling when wearing the article of clothing can be made excellent. In addition, an effect of reducing the number of steps in sewing processing of an article such as an article of clothing or an article of bedding can be obtained. The end part of the article of clothing may include, for example, an area around the collar, an area around the shoulder (the upper arm), waist, a part of a fastener, and the like in a case of a vest.

DETAILED DESCRIPTION OF THE PREFERRED EMBODIMENTS

<Embodiment of Long Fiber Nonwoven Fabric>

Figure 1:
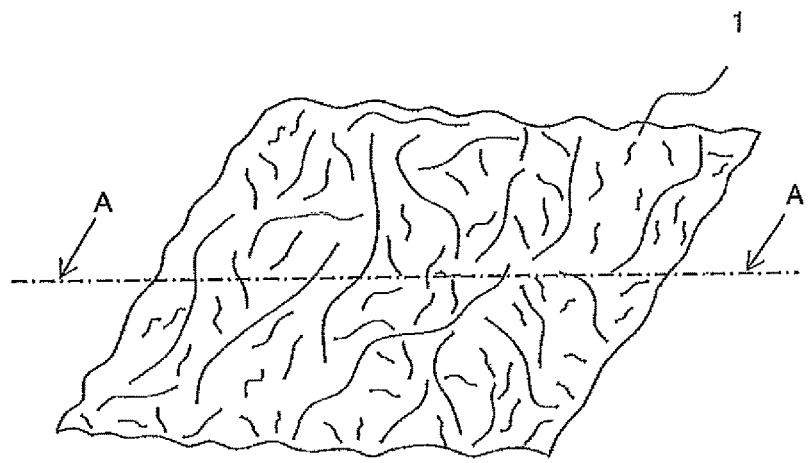
FIG. 1 is a view showing one example of a long fiber nonwoven fabric.
Figure 2:
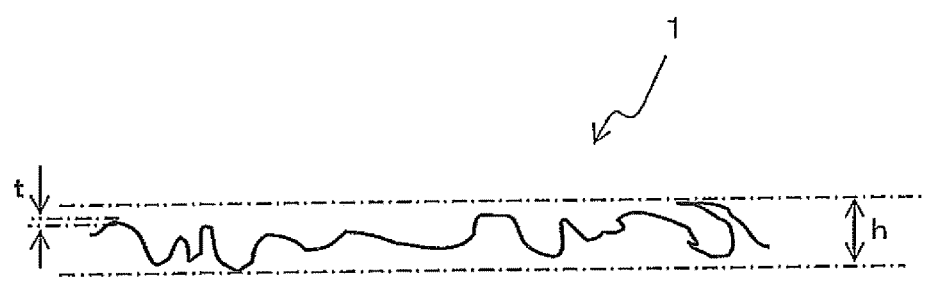
FIG. 2 is a view showing an A-A cross-section in the long fiber nonwoven fabric in FIG. 1.

A long fiber nonwoven fabric 1 of the present embodiment is shown in FIG. 1. On the long fiber nonwoven fabric 1, irregularly uneven wrinkles having a large difference in height are formed. FIG. 2 is an A-A cross-section of the long fiber nonwoven fabric 1 in FIG. 1. In FIG. 2, the long fiber nonwoven fabric 1 on which the wrinkles are formed has a bulkiness (h: a height from the level surface to the topmost part thereof when the fabric is put on the level surface) of 200 times a thickness (t) of the long fiber nonwoven fabric on which the wrinkles have not been formed yet. The thickness (t) of the long fiber nonwoven fabric 1 on which the wrinkles have not been formed yet is 0.05 mm, and the bulkiness (h) is 10 mm (200 times). The thickness (t) may be an average value of values measured at multiple points.

The long fiber nonwoven fabric 1 on which the wrinkles are formed has a fabric weight which is 3.75 times a fabric weight of the long fiber nonwoven fabric on which the wrinkles have not been formed yet. The long fiber nonwoven fabric 1 on which the wrinkle are formed has a fabric weight of 30 g/m$^2$, and the long fiber nonwoven fabric on which the wrinkles have not been formed yet has a fabric weight of 8 g/m$^2$.

The irregular wrinkles are formed by the following method. The long fiber nonwoven fabric on which the wrinkles are not formed is packed into a bag, to which heat and humidity (hot water having a temperature of 60° C. or higher, water vapor, or the like) are applied, thereby forming the wrinkle on the long fiber nonwoven fabric. It is preferable to randomly pack the long fiber nonwoven fabric on which the irregular wrinkles are not formed into a bag in a wrinkled state so as to form the irregular wrinkles. The time to apply the heat and humidity is preferably, for example, 10 minutes or more. After applying the heat and humidity, the long fiber nonwoven fabric is taken out from the bag, and it is dried with a hot air having a temperature of 40° C.

The long fiber nonwoven fabric, on which the wrinkles have not been formed yet, is produced by a crosswise lamination bonding. The long fibers in the fabric are made from a polyester resin filament having a thickness of 10 μm and have an average length of more than 100 mm. The long fibers are different from the short fiber filament.

<Other Embodiment of Long Fiber Nonwoven Fabric>

In the embodiment described above, the long fiber nonwoven fabric on which the wrinkles have not been formed yet is not limited to fabrics produced by the crosswise lamination bonding, and may be produced by another production method listed above. The long fiber, which is the material, is not limited to the polyester having a thickness of 10 μm, and the fiber may have a thickness of 0.1 μm to 100 μm as described above, and may be materials other than the polyester as described above.

The thickness (t) and the bulkiness (h) of the long fiber nonwoven fabric 1 on which the wrinkles have not been formed yet are not limited to the values described above, and t may be in the range of 0.05 mm to 2.0 mm and h may be 5 times or more, preferably 10 times or more, more preferably 50 times or more. In addition, the long fiber nonwoven fabric 1 on which the wrinkles are formed may have a fabric weight which is 3 times to 60 times the fabric weight of the long fiber nonwoven fabric on which the wrinkles have not been formed yet.

The method for forming the wrinkles is not limited to the method in which the long fiber nonwoven fabric is packed into the bag, to which the heat and humidity (for example, hot water having a temperature of 60° C., water vapor, or the like) are applied, and a pressure of atmospheric pressure or more may be applied together with the heat and humidity. The time to apply the heat and humidity is not limited to 10 minutes, and may be from 10 minutes to 24 hours. The drying of the long fiber nonwoven fabric taken out from the bag after applying the heat and humidity is not limited to use of hot air of 40° C., and the fabric may be dried at a temperature of 30° C. to 150° C., or may be naturally dried at a room temperature in a range of 18° C. to 28° C. Alternatively, another method in which the long fiber nonwoven fabric is sent to a roller to which heat having a temperature of 90° C. or higher in a speed higher than a rotation speed of the roller so that the fabric is brought into contact with the roller, thereby forming the wrinkles may be used.

<Laminate of Fabrics Having Long Fiber Nonwoven Fabric on which Wrinkles are Formed>

Figure 3:
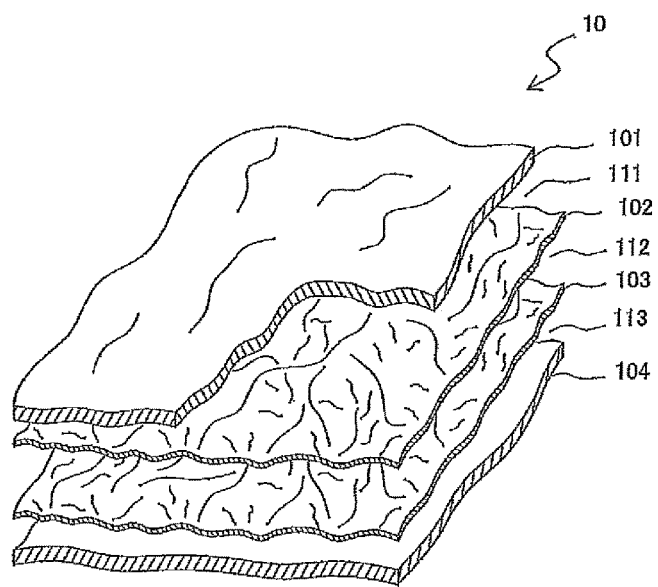
FIG. 3 is a view showing one example of a structure of the laminate of fabrics.
Figure 4:
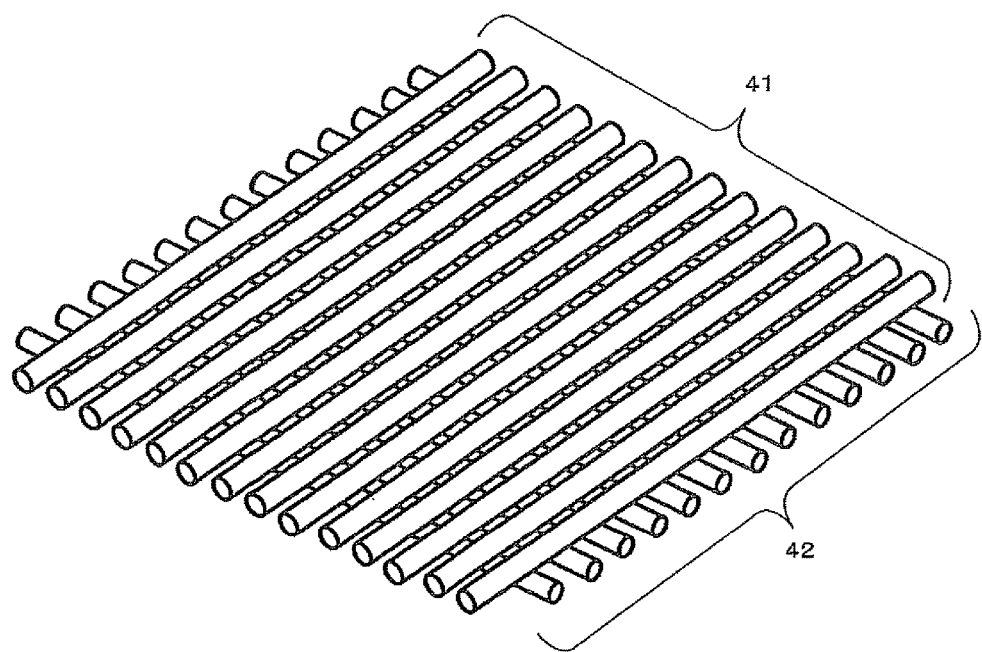
FIG. 4 is a perspective view illustrating a structure of a crosswise laminated nonwoven fabric.
Figure 5:
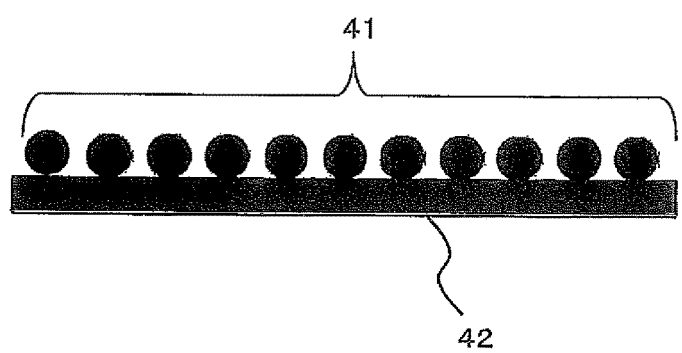
FIG. 5 is a cross-sectional view showing a structure of a crosswise laminated nonwoven fabric.

A laminate of fabrics 10 of the present embodiment is shown in FIG. 3. In the laminate of fabrics 10, a first inner layer 102 and a second inner layer 103, which are formed of a long fiber nonwoven fabric on which wrinkles are formed, are laminated, and a third space (an air layer) 112 is formed between them. A first outer layer 101 is laminated on a top surface side of the first inner layer 102 (see FIG. 3), and a first space (an air layer) 111 is formed between the first inner layer 102 and the first outer layer 101. A second outer layer 104 is laminated on a bottom surface side of the second inner layer 103 (see FIG. 3), and a second space (an air layer) 113 is formed between the second inner layer 103 and the second outer layer 104.

<Other Embodiment of Laminate of Fabrics>

The laminate of fabrics 10 described above has the two-layered inner layer, but the laminate may have mono-layered inner layer or three-layered layer. The laminate of fabrics may be formed of one or more inner layers and the first outer layer, or one or more inner layers and the second outer layer. When the inner layer is formed of multiple layers, the layers may be formed of different long fiber nonwoven fabrics formed from long fibers of different materials.

<Article of Clothing, Article of Bedding, Curtain, Article of Covering, and the Like Formed of Laminate of Fabrics Having Long Fiber Nonwoven Fabric on which Wrinkles are Formed>

An article of clothing or an article of bedding of the present embodiment is formed from the laminate of fabrics 10. The article of clothing is not particularly limited, and may include, for example, vest types, short sleeves types, long sleeves types, short pants types, long pants types, coverall types, hats, gloves, socks, balaclavas, shawls, waistcloths, mufflers, and the like. The article of bedding is not particularly limited, and may include, for example, sleeping bags, comforters, mattresses, pillows, blankets, and the like.

Fabric materials used in a house such as a curtain, a carpet, a floor covering, and a wallpaper may be formed of a monolayer or multiple layers of the long fiber nonwoven fabrics described above, or may be formed of the laminate of fabrics having the long fiber nonwoven fabric described above. The use of the long fiber nonwoven fabric or the laminate of fabrics having this long fiber nonwoven fabric of the present invention is not limited to the uses described above, and they may be applied to other uses.

What is claimed is:

1. A long fiber nonwoven fabric comprising:
    filaments having a length of more than 100 mm, said filaments consisting of a single filament composition only, wherein no other filaments are present in the fabric;
    wherein said long fiber nonwoven fabric on which an irregularly uneven wrinkle having a bulkiness such that the long fiber nonwoven fabric on which the wrinkle is formed has a fabric weight of 15 g/m$^2$ to 300 g/m$^2$;
    wherein the long fiber nonwoven fabric on which the wrinkle is formed has a bulkiness (a height from a level surface to a topmost part when the fabric is put on the level surface) of from 1.0 mm to 100.0 mm,
    wherein said filament consists of polyester, and
    wherein the long fiber nonwoven fabric has no overlapped parts.

2. The long fiber nonwoven fabric according to claim 1, wherein each filament has a thickness of 1 μm to 100 μm.

3. The long fiber nonwoven fabric according to claim 1, wherein the long fiber nonwoven fabric on which the wrinkle is formed has the bulkiness of from 10.0 mm to 100.0 mm.

4. The long fiber nonwoven fabric according to claim 1, wherein the long fiber nonwoven fabric is provided in a laminated structure in which arranged warp yarns and arranged weft yarns are overlapped with each other.

5. A laminate of fabrics comprising the long fiber nonwoven fabric according to claim 1, and a first fabric which is laminated on one side of the long fiber nonwoven fabric, wherein a first space is formed between the long fiber nonwoven fabric and the first fabric.

6. An article of covering comprising the laminate of fabrics according to claim 5.

7. The laminate of fabrics according to claim 5, wherein two or more of the long fiber nonwoven fabrics are laminated, wherein a space is formed between the long fiber nonwoven fabrics.

8. An article of clothing comprising the laminate of fabrics according to claim 5.

9. An article of bedding comprising the laminate of fabrics according to claim 5.

10. A curtain comprising the laminate of fabrics according to claim 5.

11. The laminate of fabrics according to claim 5, which further comprises a second fabric which is laminated on the other side of the long fiber nonwoven fabric, wherein a second space is formed between the long fiber nonwoven fabric and the second fabric.

12. The laminate of fabrics according to claim 11, wherein two or more of the long fiber nonwoven fabrics are laminated, wherein a third space is formed between the long fiber nonwoven fabrics.

13. An article of clothing comprising the laminate of fabrics according to claim 12.

14. An article of bedding comprising the laminate of fabrics according to claim 12.

15. A curtain comprising the laminate of fabrics according to claim 12.

16. An article of covering comprising the laminate of fabrics according to claim 12.

* * * * *